April 24, 1956 R. A. MULLANEY 2,743,109

RECORD STORING AND EJECTING MECHANISM FOR A PHONOGRAPH

Filed May 27, 1950

RALPH A. MULLANEY
*INVENTOR.*

BY Francis W. Crotty
HIS ATTORNEY

United States Patent Office 2,743,109

Patented Apr. 24, 1956

2,743,109

RECORD STORING AND EJECTING MECHANISM FOR A PHONOGRAPH

Ralph A. Mullaney, Elmwood Park, Ill., assignor to Zenith Radio Corporation, a corporation of Illinois Application May 27, 1950, Serial No. 164,768

4 Claims. (Cl. 274—10)

Figure 1:
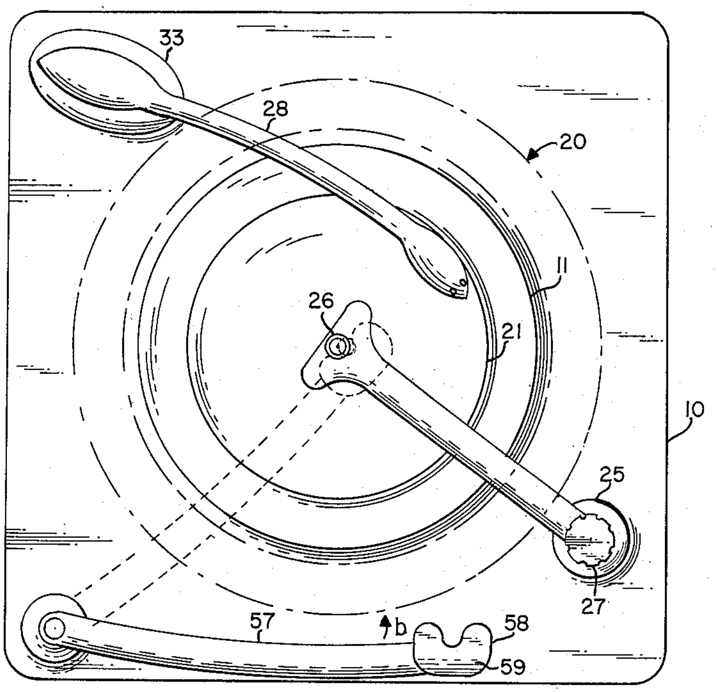

This invention relates to a novel record-storing and ejecting mechanism for a phonograph and more particularly to such a mechanism utilizing a spindle of the offset type. As used throughout the specification, the term "offset spindle" refers to an arrangement wherein the spindle includes a lower portion extending upwardly from a turntable and an upper portion, the axis of which is slightly displaced from that of the lower portion to define a shelf at the uppermost extremity of the lower spindle portion for storing records. The upper spindle portion preferably includes a detaining member for preventing movement of the next lowermost record when, in a record-ejecting cycle, the lowermost record is laterally displaced from the shelf into alignment with the lower spindle portion for feeding onto the turntable.

Presently existing record discs are of 7, 10 or 12 inch diameters and are provided with a centering aperture having a diameter of substantially 0.281 inch. These records are designed to be played on a turntable having a centering spindle approximately 0.275 inch in diameter. For automatic playing of a group of records having such varied diameters, a common type of system includes a spindle of the offset type which internally contains a record-ejecting mechanism. Since the spindle is limited to a diameter of 0.275 inch, a great mechanical handicap is imposed on the equipment. Additionally, inasmuch as it is necessary to under-cut the upper spindle portion sufficiently to hide an ejector finger during one part of the record-changing cycle the spindle is undesirably weakened at its offset and hence is fragile.

This system has certain pronounced disadvantages which severely limit its practical use. In the first place, the entire stack of records may bear directly and only upon the ejector finger during some portion of a record-changing cycle. As a consequence, the ejector finger is pressed hard against the lowermost record of the stack which may be seriously damaged. Continuous wear of this type in successive playings of the record may destroy it in the area adjacent the centering aperture. Moreover, in an ejecting operation the record-ejector element engages a small portion of the area of the record that defines its centering aperture and, with continued use, the configuration of this aperture may be distorted to such an extent that the record can no longer be utilized by the mechanism.

It is an object of this invention, therefore, to provide a novel ejecting mechanism for a phonograph including a spindle of the offset type which overcomes one or more of the aforementioned objections of prior arrangements.

It is a further object of this invention to provide a novel record-ejecting mechanism which does not subject the records to undue wear.

It is a still further object of the invention to provide a novel ejecting mechanism which is simple in arrangement, easy to manufacture and assemble and yet is entirely efficient and reliable in operation.

In accordance with the invention, the record-storing and ejecting mechanism for a phonograph comprises a spindle which includes a lower portion and an upper portion offset from the lower portion to define a horizontal shelf at the uppermost extremity of the lower portion for storing a stack of records in alignment with the upper portion. The mechanism further includes a record ejector which has a high-friction surface recessed to receive the lower spindle portion and adapted to engage frictionally the under surface of the lowermost record of the stack in the vicinity of the lower spindle portion. The ejector is movable in a direction substantially parallel to the shelf of the spindle laterally to displace the lowermost record of the stack into alignment with the lower spindle portion. The ejector is further movable to a position clear of a record descending along the lower spindle portion. A driving motor mechanically coupled to the ejector is provided for displacing the ejector to effect a record-feeding cycle.

Figure 2:
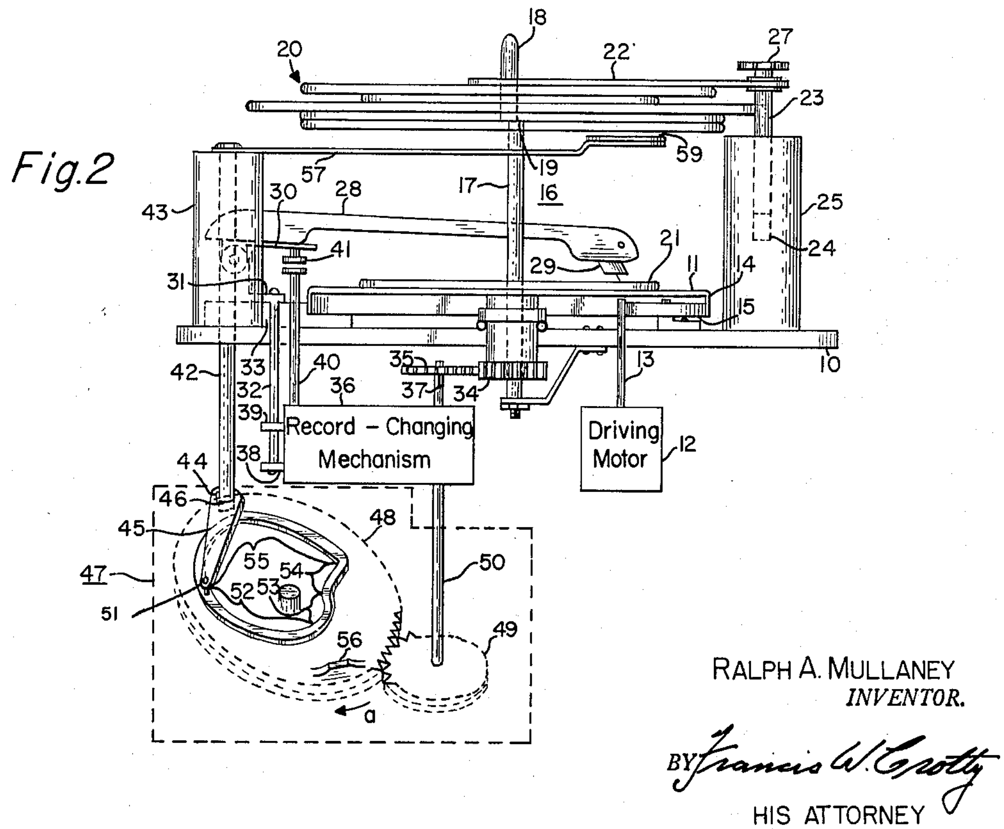

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Fig. 1 is a plan view of a phonograph including a record-storing and ejecting mechanism embodying the present invention; and Fig. 2 is a simplified, functional representation, partly in block, of the phonograph shown in Fig. 1.

With reference now to Fig. 1 of the drawing, the record changer includes a mounting base 10 on which a turntable 11 is supported for rotation. As more clearly shown in Fig. 2, a driving motor 12 having a driving shaft 13 is coupled to the inner side of a depending flange or rim 14 of turntable 11 by an idler gear 15. Driving motor 12 may be of the synchronous variety and the rotational speed of turntable 11 may be predetermined by the diameters of shaft 13 and flange 14. Although a particular mechanical coupling system has been illustrated, it is to be understood that any other form of coupling between motor 12 and turntable 11, either of the single-speed or of the multi-speed type, may be employed.

A central spindle 16 includes a lower portion 17 extending upwardly in coaxial alignment with the turntable 11. An upper portion 18 of spindle 16 is offset from portion 17 to define a horizontal shelf 19 at the upper extremity of section 17. A plurality of record discs of various diameters may be stored in a stack 20 in alignment with the upper spindle section 18 upon shelf 19. Records of the stack 20 are shown in outline in Fig. 1. One of the records 21 is positioned on turntable 11 for playing.

A record-stack leveling arm 22 of conventional design bears upon the uppermost record of stack 20 to maintain the stack in position on self 19 with the records parallel to the surface of turntable 11. Leveling arm 22 extends to the vicinity of spindle 16 from a rod 23 which is slidably and rotatably supported within an opening 24 of a member 25 affixed to base 10 at a distance from spindle 16 greater than one-half the diameter of the largest records to be played. For this arrangement, leveling arm 22 is biased downwardly by its own weight and the weight of rod 23. The free extremity of arm 22 includes an opening 26 for receiving upper spindle portion 18 and a knob 27 secures the arm to rod 23. By manipulating knob 27, arm 22 may be raised to clear opening 26 of spindle portion 18 and may then be rotated in a direction away from a spindle 16 to a position such that records may be loaded in the magazine 18, 19 or removed from turntable 11.

Tone arm 28 having a conventional stylus and transducer element 29 affixed to one end is supported for pivotal movement about a horizontal axis by a hinge having companion upper and lower portions 30 and 31, upper hinge portion 30 being affixed to one end of tone arm 28. The tone arm further is supported for rotation about a vertical axis by means of a vertical shaft 32 affixed at one end to hinge portion 31 which rests upon a bearing block 33 secured to base member 10. Hence, tone arm 28 is supported in a manner whereby the stylus of element 29 is engageable with the grooves of record disc 21 on turntable 11.

A gear 34, positioned below base 10, is mechanically coupled with turntable 11 to be rotatable therewith and is in driving engagement with a gear 35, in turn, coupled to a record-changing mechanism 36 by a shaft 37. This mechanism, which may be of any well known construction, includes means for converting the rotary motion imparted to turntable 11 by driving motor 12 into the various movements necessary to perform a record-changing cycle and its operating details will be explained more fully hereinafter. Mechanism 36 is coupled with shaft 32 by a conventional cam arm 38 and a trip lever 39. Further, mechanism 36 is coupled with one extremity of a tone arm pusher rod 40 which is supported for vertical movement in the vicinity of tone arm hinge 30, 31 with the other extremity thereof in incipient engagement with a projection 41 of upper hinge portion 30.

A vertical-ejector shaft 42 is rotatably and slidably supported within a hollow standard 43 affixed to base 10 at a distance from spindle 16 greater than one-half the diameter of the largest records to be played. The lower portion of shaft 42 is provided with a longitudinal key 44 and a follower arm 45 includes an opening 46 arranged to receive the shaft 42 and its key 44. The arm 45 is included within a cam mechanism 47 that also includes a cam wheel 48 provided with peripheral gear teeth in driving engagement with a gear 49 coupled with mechanism 36 by a shaft 50. Although system 47 has been shown as separate and distinct from mechanism 36, in the usual case the cam system 47 is an integral portion of the record-changing mechanism 36. Arm 45 carries a cam follower 51 which is arranged to be received by a channel-like cam track including portions 52, 53, 54 and 55 that is supported on the upper face of cam wheel 48. The lowermost extremity of shaft 42 bears against the upper surface of cam wheel 48 and a portion 56 of this wheel is deformed to define a cam surface for engaging shaft 42 when wheel 48 is rotated approximately 180° from the position shown. The upper end of shaft 42 is affixed to one extremity of an elongated carriage or arm 57 which thereby is supported for longitudinal and pivotal movement about the axis of shaft 42. The other extremity of carriage 57 carries a record ejector 58 which has a high-friction surface 59, for example of a rubber, adapted to engage frictionally the under surface of the lowermost record of stack 20. The ejector 58 is movable in a direction substantially parallel to shelf 19 to displace laterally the lowermost record from alignment with spindle section 18 into alignment with the lower spindle portion 17 and further is movable to a position clear of a record descending along the lower spindle portion.

The driving motor 12 which is coupled to turntable 11 is also coupled to record-changing mechanism 36 as stated above. Furthermore, since record-changing mechanism 36 is coupled with ejector shaft 42, the driving motor is utilized to oscillate the shaft and so displace ejector 58 to effect a record-feeding cycle.

In describing a record-feeding cycle, let it be assumed that stylus 29 of tone arm 28 is tracking in the groove of record 21 being rotated by turntable 11. When the stylus reaches the eccentric portion of the record groove, reverse movement of the tone arm is imparted by trip arm 39 to a trip arrangement (not shown) of record-changing mechanism 36. It is to be understood that any well-known form of trip arrangement may be incorporated in record-changing mechanism 36, including those responsive to velocity change or position of tone arm 28. Whatever the type employed, this portion of the record-changing mechanism is utilized to actuate a conventional clutch (not shown) also contained within the changing mechanism for completing a driving connection between shaft 37 and the various elements of the mechanism.

The rotational movement of shaft 37, which is driven by motor 12, is converted to vertical motion to displace rod 40 upwardly whereupon it engages projection 41 to pivot tone arm 28 about the horizontal axis of hinge 30, 31 and stylus 29 is carried from engagement with the groove of disc 21. Next, movement is imparted to cam arm 38 to rotate shaft 32 and carry tone arm 28 outwardly from the center of record 21 beyond the outer periphery thereof.

Concurrently with the movement of the tone arm, shaft 50 is rotated to drive cam wheel 48 in the direction designated by arrow *a*. As wheel 48 rotates, cam follower 51 traverses the cam section 52 and is gradually displaced thereby towards the center of the wheel. This movement of the cam follower pivots arm 57 in the direction represented by arrow *b* of Fig. 1, carrying the ejector towards spindle 16 to the position denoted by the broken-line construction in Fig. 1. The orientation of the several cam sections of wheel 48 is such that when the high-friction surface 59 of the ejector reaches the central ungrooved or labeled area of the under surface of the lowermost record in stack 20, cam section 56 rides under shaft 42 and displaces the shaft vertically. The throw of this cam section is selected to cause the friction surface 59 of arm 57 to be driven into frictional engagement with the record.

While the ejector is thus maintained in frictional engagement with the record, cam section 53 causes cam follower 51 to rotate arm 57 away from the spindle. During this outward movement of arm 57 the lowermost record of the stack is displaced laterally off shelf 19 and is brought into alignment with spindle portion 17. At this time, cam section 56 clears shaft 42 which drops to the upper surface of wheel 48 and lowers ejector 57 from its record-engaging position. Thereupon cam section 54 accelerates the outward movement of arm 57, retracting the ejector arm to its normal position shown in the full-line construction of Fig. 1. This final movement of the ejector arm clears the path of the record previously transferred from shelf 19 to spindle portion 17 and permits that record to drop to the turntable for playing. At this time cam follower 51 rides in cam section 55 and the ejector remains in normal position as wheel 48 is returned to its initial position.

Inasmuch as the record ejector is not included as an integral part of spindle 16, a rugged spindle structure may be utilized. Consequently, the ejector mechanism of the present invention is not subject to the mechanical handicap and weakened spindle structure inherent in certain prior-art arrangements. Moreover, the force required to eject a record from the stack is distributed over a comparatively large area and is not concentrated at the periphery of the centering aperture. In that manner, damage due to an ejector working against the centering aperture, as in some previous arrangements, is avoided.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A record-storing and ejecting mechanism for a phonograph comprising: a spindle including a lower portion and an upper portion offset from said lower portion to define a horizontal shelf at the uppermost extremity of said lower portion for storing a stack of records in alignment with said upper portion; a record-ejecting element having a high-friction surface recessed to receive said lower spindle portion for frictionally engaging the under surface of the lowermost record of said stack; a carriage supporting said element for movement in a direction substantially parallel to said shelf from a record-feeding position in which said element frictionally engages said lowermost record in the vicinity of said lower spindle portion to another position in which said element is clear of a record descending along said lower spindle portion; and a driving motor mechanically coupled to said carriage to displace said carriage and effect a record-feeding cycle.

2. A record-storing and ejecting mechanism for a phonograph comprising: a spindle including a lower portion and an upper portion offset from said lower portion to define a horizontal shelf at the uppermost extremity of said lower portion for storing a stack of records in alignment with said upper portion; a record ejector having a high-friction surface recessed to receive said lower spindle portion for frictionally engaging the under surface of the lowermost record of said stack; an elongated carriage supporting said element at one end and mounted at the other end for pivotal movement about a vertical axis and in a direction substantially parallel to said shelf to displace said element from a record-feeding position in which said element frictionally engages said lowermost record in the vicinity of said lower spindle portion into another position in which said element is clear of a record descending along said lower spindle portion; and a driving motor mechanically coupled to said carriage to rotate said carriage and effect a record-feeding cycle.

3. A record-storing and ejecting mechanism for a phonograph comprising: a spindle including a lower portion and an upper portion offset from said lower portion to define a horizontal shelf at the uppermost extremity of said lower portion for storing a stack of records in alignment with said upper portion; a record ejector supported for rotation of movement in a direction substantially parallel to said shelf and having a high-friction surface movable between a record-feeding position in which said surface frictionally engages the under surface of the lowermost record in the vicinity of said lower spindle portion of said stack to a normal position in which said ejector is below said stack and is clear of a record descending along said lower spindle portion; actuating means including at least one cam surface for moving said ejector from said normal position to said record-feeding position at the start of a record-changing cycle; actuating means including a second cam surface for rotatably moving said ejector at one rate from said record-feeding position in a direction substantially parallel to said shelf to an intermediate position in which said lowermost record is in axial alignment with said lower spindle portion and further including a third cam surface for accelerating the rate of movement of said ejector from said intermediate position to said normal position to complete said cycle; and a driving motor for driving said actuating means.

4. A record-storing and ejecting mechanism for a phonograph comprising: a spindle including a lower portion and an upper portion offset from said lower portion to define a horizontal shelf at the uppermost extremity of said lower portion for storing a stack of records in alignment with said upper portion; a record ejector having a high-friction surface recessed to receive said lower spindle portion and movable between a record-feeding position in which said surface frictionally engages the under surface of the lowermost record of said stack in the vicinity of said lower spindle portion to a normal position in which said ejector is clear of a record descending along said lower spindle portion; actuating means including one cam surface for locating said ejector in said record-feeding position at the start of a record-changing cycle; actuating means including another cam surface for moving said ejector from said record-feeding position in a direction substantially parallel to said shelf to said normal position to eject said lowermost record from said stack; and a driving motor for driving said actuating means.

References Cited in the file of this patent

UNITED STATES PATENTS

| | | |
|---|---|---|
| 2,026,257 | Stockton | Dec. 31, 1935 |
| 2,545,643 | Bender | Mar. 20, 1951 |

FOREIGN PATENTS

| | | |
|---|---|---|
| 545,956 | Great Britain | June 19, 1942 |
| 554,553 | Great Britain | July 8, 1943 |